US010984475B1

(12) United States Patent
Potter et al.

(10) Patent No.: US 10,984,475 B1
(45) Date of Patent: Apr. 20, 2021

(54) METHOD AND SYSTEM FOR IMPLEMENTING COUNTERPARTY CREDIT RISK CALCULATIONS

(71) Applicant: JPMorgan Chase Bank, N.A., NY, NY (US)

(72) Inventors: Matthew J. Potter, London (GB); Rakesh R. Pillai, East Brunswick, NJ (US); Matthias Arnsdorf, New York, NY (US); Bin Jia, Newton, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 462 days.

(21) Appl. No.: 15/390,803

(22) Filed: Dec. 27, 2016

Related U.S. Application Data

(60) Provisional application No. 62/387,219, filed on Dec. 24, 2015.

(51) Int. Cl.
*G06Q 40/06* (2012.01)
*G06Q 40/04* (2012.01)

(52) U.S. Cl.
CPC .......... *G06Q 40/06* (2013.01); *G06Q 40/04* (2013.01)

(58) Field of Classification Search
CPC .......... G06F 7/00; G06Q 40/00; G06Q 10/06; G06Q 10/04; G06Q 40/06; G06Q 40/04; G06Q 40/02; G06Q 40/025; G10L 15/1815
See application file for complete search history.

(56) References Cited

U.S. PATENT DOCUMENTS

| | | | | |
|---|---|---|---|---|
| 5,802,499 A | * | 9/1998 | Sampson | G06Q 40/02 705/35 |
| 6,771,252 B2 | * | 8/2004 | Miller | G06T 11/206 345/158 |
| 6,867,777 B2 | * | 3/2005 | Miller | G06F 15/0275 345/440 |
| 6,889,362 B2 | * | 5/2005 | Wattenberg | G06F 3/0481 708/174 |
| 8,832,562 B2 | * | 9/2014 | de Brebisson | G06F 15/025 715/743 |
| 9,218,339 B2 | * | 12/2015 | Zechner | G10L 15/1815 |
| 9,317,564 B1 | * | 4/2016 | Korolev | G06F 16/00 |
| 9,996,595 B2 | * | 6/2018 | Bond | G06F 16/248 |

(Continued)

FOREIGN PATENT DOCUMENTS

WO    WO-2005029254 A2 *  3/2005 ........... G06Q 40/025

OTHER PUBLICATIONS

Kestelyn, J., "Calculating CVA with Apache Sparktm," Cloudera—Ask Bigger Questions, (Mar. 4, 2015).*

(Continued)

*Primary Examiner* — Daniel S Felten
(74) *Attorney, Agent, or Firm* — Hunton Andrews Kurth LLP

(57) ABSTRACT

According to an embodiment of the present invention, an automated computer implemented system determines counterparty credit risk calculations. The system comprises a memory component; and a calculation engine programmed to: generate a computation graph of calculation components; build mappings of how each calculation component is connected; and perform path loop calculations where data is shuffled at each stage based on the mappings.

16 Claims, 7 Drawing Sheets

(56) References Cited

U.S. PATENT DOCUMENTS

| | | | | |
|---|---|---|---|---|
| 10,019,442 B2* | 7/2018 | Nefedov | | G06F 16/248 |
| 10,031,071 B2* | 7/2018 | Norris | | G01N 21/251 |
| 2003/0041078 A1* | 2/2003 | Child | | G06F 15/02 |
| | | | | 708/162 |
| 2003/0115128 A1* | 6/2003 | Lange | | H01L 29/4941 |
| | | | | 705/37 |
| 2004/0024692 A1* | 2/2004 | Turbeville | | G06Q 40/08 |
| | | | | 705/38 |
| 2005/0114244 A1* | 5/2005 | Miri | | G06Q 10/06 |
| | | | | 705/35 |
| 2007/0192242 A1* | 8/2007 | Kunz | | G06Q 40/02 |
| | | | | 705/38 |
| 2009/0006275 A1* | 1/2009 | Takano | | G06Q 40/00 |
| | | | | 705/36 R |
| 2009/0190839 A1* | 7/2009 | Higgins | | G06F 16/3347 |
| | | | | 382/209 |
| 2016/0078531 A1* | 3/2016 | Bartlett | | G06Q 40/025 |
| | | | | 705/38 |
| 2016/0203413 A1* | 7/2016 | Ruiz | | G06Q 10/04 |
| | | | | 706/52 |
| 2018/0089577 A1* | 3/2018 | Ruiz | | G06Q 30/02 |
| 2018/0219888 A1* | 8/2018 | Apostolopoulos | | |
| | | | | G06F 16/9024 |

OTHER PUBLICATIONS

Definition of Apache Spark, from Wikipedia en.wikipedia.org/wiki/Apache_Spark.*

Spark Website https://spark.apache.org (2010).*

Langkamp C., "Counterparty credit risk management in industrial corporates," MPRA, University of Duisburg-Essen (Oct. 2011) (Year: 2011).*

Li, G., Counter Credit Risk and Options Pricing: An Empirical Study (Jan. 2014) (Year: 2014).*

* cited by examiner

METHOD AND SYSTEM FOR IMPLEMENTING COUNTERPARTY CREDIT RISK CALCULATIONS

CROSS REFERENCE TO RELATED APPLICATIONS

The application claims priority to U.S. Provisional Application 62/387,219, filed Dec. 24, 2015, the contents of which are incorporated herein in its entirety.

FIELD OF THE INVENTION

The present invention generally relates to determining counterparty credit risk calculations and more specifically to distributing compute workload in various credit risk calculations including value adjustment calculations, such as credit value adjustment (CVA), funding value adjustment (FVA), capital value adjustment (KVA), debit value adjustment (DVA), etc.

BACKGROUND OF THE INVENTION

Since the 2007 global financial crisis, financial institutions more accurately measure the risks of various financial products. For example, financial institutions adjust derivative prices for the risk of the counterparty's default by credit or debit valuation adjustments (CVA/DVA).

Calculating the CVA of a portfolio typically requires Monte-Carlo simulation with a large number of scenarios. The computation and storage requirement for what-if scenario analysis grows significantly when the portfolio is large and contains a variety of financial instruments across multiple asset classes. To handle this complexity, distributed computing platforms improve performance, flexibility, modularity, and maintainability of programming infrastructure.

A Gauss calculator is a Monte Carlo Simulation engine that prices derivatives, securities financing, cleared futures and options (F&O) trades on an average of 2000 paths up to 100 years into the future to compute credit value adjustment (CVA), funding valuation adjustment (FVA) and Credit Exposures. For example, a Gauss production batch could use 2000 Central processing units (CPUs) and 150 Graphical Processing Units (GPUs) to generate the CVA balances and CVA billing in its overnight run. The portfolio is nonlinear in its pricing as certain trades are cheaper to price than other, the number of trades varies on a daily basis and Gauss does a marginal run for each new, edited or unwound trade. This causes long tails and requires a larger reserve of CPUs and GPUs to complete the processing within agreed service level agreements (SLAs). The workload is distributed to hosts based on a profiling run on the prior day's portfolio to meet SLAs.

These and other drawbacks exist.

SUMMARY OF THE INVENTION

Accordingly, one aspect of the invention is to address one or more of the drawbacks set forth above. According to an embodiment of the present invention, a computer implemented system determines counterparty credit risk calculations. The system comprises: a memory component; and a calculation engine comprising a programmed computer processor, the calculation engine coupled to the memory and further programmed to: generate a computation graph of calculation components; build mappings of how each calculation component is connected; and perform path loop calculations where data is shuffled at each stage based on the mappings.

According to another embodiment of the present invention, a computer implemented system determines counterparty credit risk calculations where a calculation engine is programmed to: separate out pricing of mark to marketing (MtM) data from aggregation to different exposure metrics; hold a computed forward mark to markets in the memory component to reuse in one or more workflows; randomly group trades on a compute grid; and aggregate large counterparties as a whole.

According to yet another embodiment of the present invention, an automated computer implemented system determines counterparty credit risk calculations where a calculation engine is programmed to: join datasets to form inputs to simulation paths; calculate a profile of forward mark to marketing (MtMs) data for each simulation path; determine market values to be calculated to price each trade; determine a set of fitting variables (RFVs); for each fitting variable (RFV), calculate a set of simulated paths from initial market data; simulate market values for each path; and based on an aggregation graph, calculate exposure statistics for each path.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
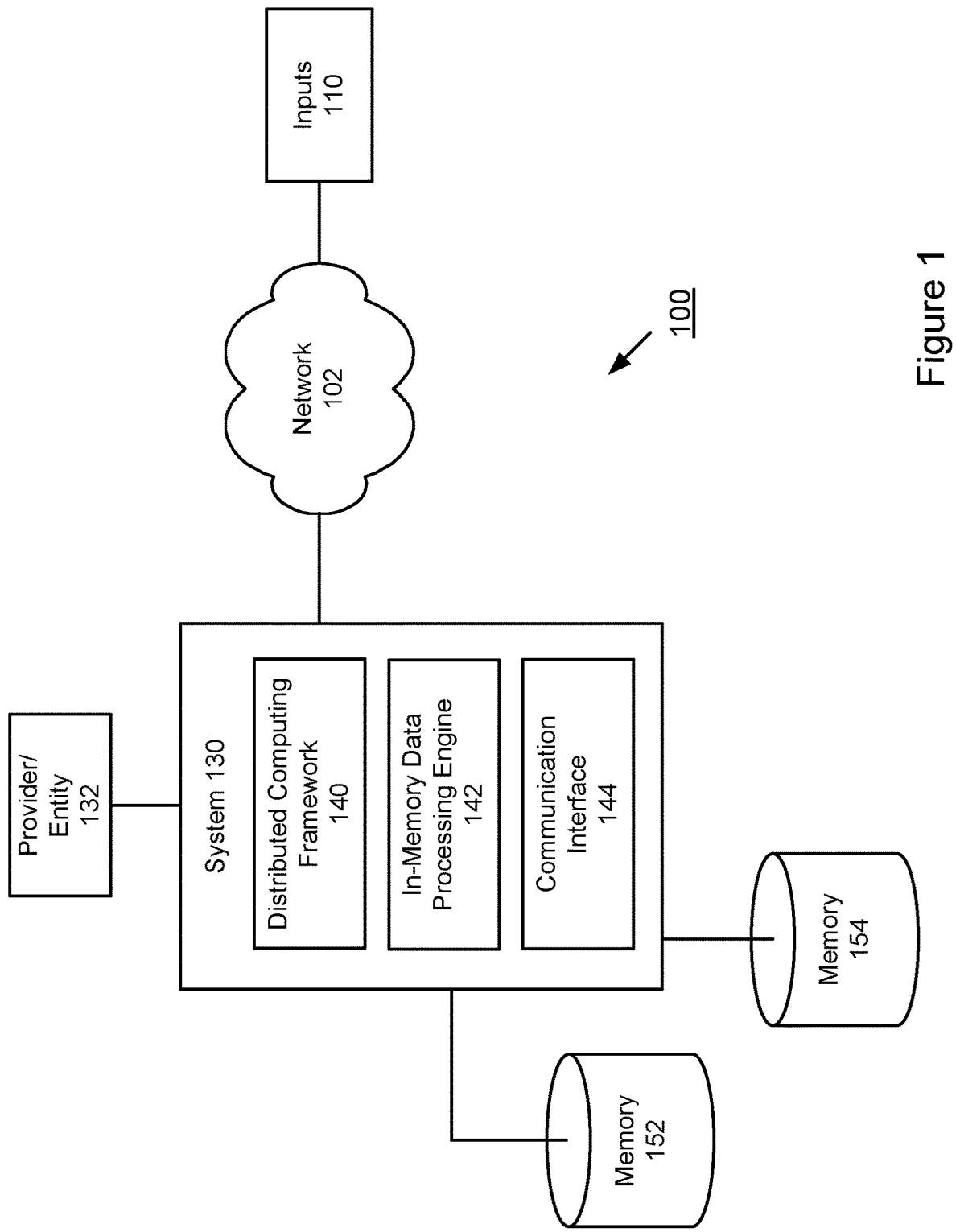
FIG. 1 is an exemplary system diagram illustrating counterparty credit risk calculations, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The computational complexity of estimating the CVA is significant and generally requires significant number of workstations and other processing components and systems. Financial institutions may implement customized parallel and distributed computing platforms to perform these calculations in a reasonable time. Generally, financial institutions hold all the pricing of instruments in memory to calculate various statistics. However, this requirement results in a large memory consumption. As a result, the current proprietary solutions are expensive and hard to scale with respect to fault tolerance.

An embodiment of the present invention is directed to implementing a distributed processing engine programmed to calculate value adjustment calculations, e.g., the CVA of a portfolio over a cluster of thousands of commodity nodes. An embodiment of the present invention may implement APACHE SPARK™ to allow the computations to scale to a large number of nodes reliably where failure of nodes is managed by the framework. Furthermore, APACHE SPARK™ may hold the price results of a large portfolio simulation in memory across thousands of nodes in support of calculating various statistics on demand. While APACHE SPARK™ is discussed as an exemplary illustration, other distributed processing engines and architectures may be implemented in accordance with the various embodiments of the present invention.

An embodiment of the present invention is directed to distributing compute workload in a value adjustment calculations. For example, the innovative system separates the pricing of the mark-to-marketing (MtM) from aggregation to different exposure metrics. Mark-to-marketing generally refers to a measure of the fair value of accounts that may change over time, such as assets and liabilities. For example, mark-to-marketing aims to provide a realistic appraisal of an company's current financial situation. The system then holds the compute forward MtMs in memory and reuses in different workflows. This may include what-if Marginal Pricing, CVA PnL and other workflows. The system then randomly groups the trades on a compute grid and thereby reduce or eliminates the need to bucket the trades and counterparty based on portfolio characteristics. An embodiment of the present invention aggregates large counterparties as a whole thereby eliminating the need to sub-net or otherwise break the counterparty into small units. Counterparty risk may refer to a risk that a party in an agreement may default. For example, counterparty risk may represent a risk that a counterparty will not pay as obligated on a bond, derivative, insurance policy or other contract. Financial institutions may hedge or take out credit insurance or, in the context of derivatives, require a posting of collateral.

The innovative system and method realizes significantly improved resource utilization and reduces or eliminates long tails when portfolio composition changes. The innovative system and method further significantly improves the performance of various what-if marginal pricing and other calculations/considerations.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 illustrates a schematic diagram of a system 100 that calculates counterparty credit risk calculations, according to an exemplary embodiment. As illustrated, Network 102 may be communicatively coupled with various sources of data, represented by Input 110.

Network 102 may communicate with various sources of data, represented by 110, 112, 114. In addition, Network 102 communicates with System 130 that provides various services, products, processing and/or other features. System 130 may include a Distributed Computing Framework 140, In-Memory Data Processing Engine 142 and Communication Interface 144. Processing Engine 142 may be coupled to various memory components, represented by Memory 152 and 154. The processing features described herein may be provided by an Entity, such as a financial institution and/or a third party provider, represented by 132. Also a third party provider may operate with and/or in connection with Entity 130, for example.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Entity 130 may communicate with various recipients, LOB owners, managers, etc., via Communication Interface 144, using any mobile or computing device, such as a laptop computer, a personal digital assistant, a smartphone, a smartwatch, smart glasses, other wearables or other computing devices capable of sending or receiving network signals.

Entity 130 may be communicatively coupled to Memory Components 152, 154. Memory Components 152, 154 may include any suitable data structure to maintain the information and allow access and retrieval of the information. For example, Memory Components 152, 154 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Memory Components 152, 154 may be any suitable storage device or devices. The storage may be local, remote, or a combination thereof with respect to Memory Components 152, 154. Memory Components 152, 154 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Memory Components 152, 154 may have back-up capability built-in. Communications with Memory Components 152, 154 may be over a network, or communications may involve a direct connection between Memory Components 152, 154 and System 130, as depicted in FIG. 1. Memory Components 152, 154 may also represent cloud or other network based storage.

Figure 2:
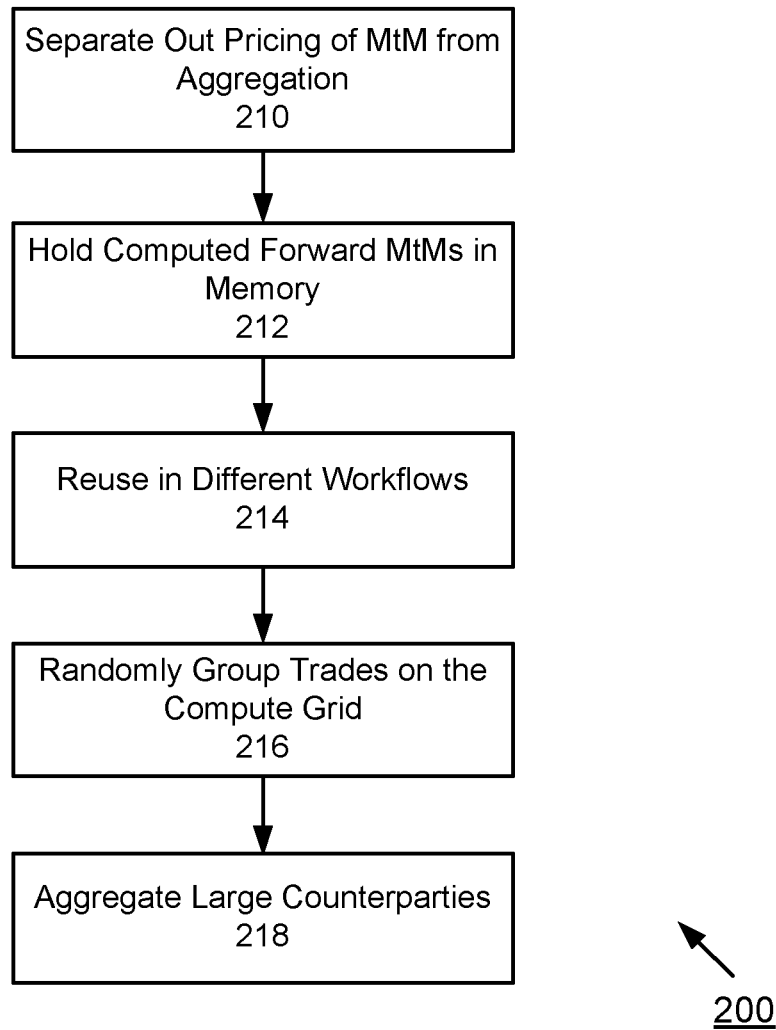
FIG. 2 is an exemplary flowchart illustrating counterparty credit risk calculations, according to an embodiment of the present invention.

FIG. 2 is an exemplary flowchart illustrating counterparty credit risk calculations, according to an embodiment of the present invention. Step 210 separates out the pricing of the mark-to-marketing (MtM) from aggregation to different exposure metrics. Mark-to-marketing refers to accounting for the fair value of an asset or liability based on a current market price or for similar assets and liabilities, for example. Step 212 then holds the computed forward MtMs in memory. Step 214 then reuses in different workflows. This may include what-if Marginal Pricing, CVA profit and loss (PnL), and other calculations, scenarios and metrics. Step 216 may then randomly group the trades on the compute grid. This eliminates the need to bucket the trades and counterparty based on the portfolio characteristics. Step 218 aggregates large counterparties as a whole thereby eliminating the need to sub-net (e.g., break the counterparty into small units). The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The details associated with these steps will be described in greater detail below.

An embodiment of the present invention significantly improves resource utilization and further reduces and/or eliminates the long tails when portfolio composition changes. Moreover, the performance of the what-if Marginal Pricing is significantly improved.

An embodiment of the present invention is directed to improving computing resource utilization without deterioration in quality of the calculated value adjustments, e.g., CVA, FVA, VPA values, etc. The system separates out the pricing of the trades from the aggregation of the metrics and uses a precomputed forward mark to marketing for related workflows including what-if marginal pricing and CVA, FVA PnL runs, for example. An embodiment of the present invention is directed to separating calculations in a manner that treats the calculations as a whole, rather than segmenting by counterparty. This further enables the system to reduce duplicate calculations, which then may be shared among an entire cluster.

Figure 3:
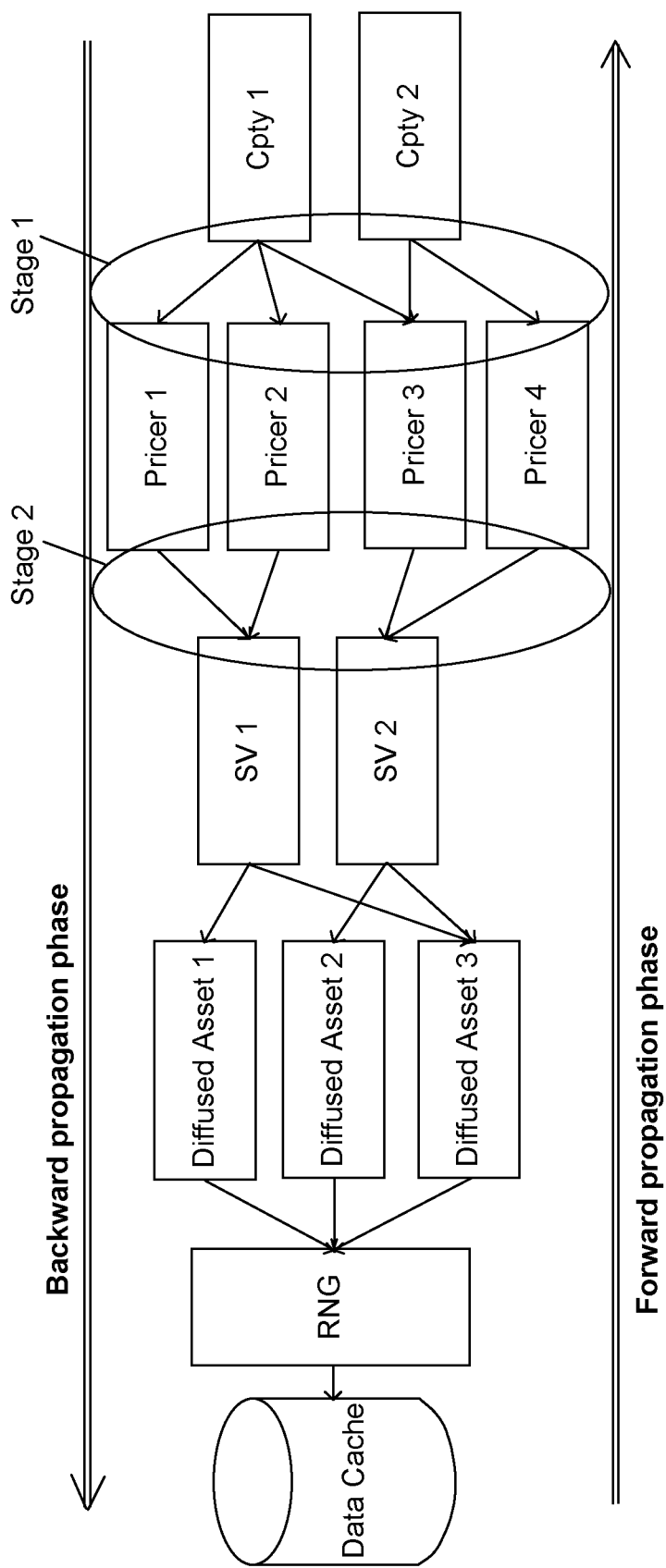
FIG. 3 illustrates a distributed compute workload, according to an embodiment of the present invention.

FIG. 3 illustrates a distributed compute workload, according to an embodiment of the present invention. An embodiment of the present invention is directed to distributing compute workload in various value adjustment calculations. As illustrated in FIG. 3, Cpty 1 and Cpty 2 represent Counterparties; Pricer 1, 2, 3 and 4 represent payoff evaluations of trades or legs of trades; SV 1 and SV 2 represent state variables; Diffused Asset 1, 2, 3 represent diffusion processes which may be driven by a model for each asset; RNG represents a random number generator; and Data Cache represents a persistent store of trade and market data. Additional components may be replicated, combined and/or otherwise implemented in accordance with the various embodiments of the present invention.

As shown in FIG. 3, an embodiment of the present invention targets the separation of pricing from aggregation. This approach is directed to eliminating a need for bucketing by grouping trades randomly to be priced. Further, subnetting may be eliminated as the ability to aggregate large counterparties as a whole are realized because MtMs are pre-computed. Also, diffusion time may increase as the number of groups of trades are reduced so fewer state variables (SVs) calculation may be shared between pricers. An embodiment of the present invention is directing to eliminating long tails and simplifying distribution logic. For example, the global compute time may increase if a greater number of small groups are implemented compared to fewer larger groups, where a total number of trades are constant.

FIG. 3 further illustrates a backward propagation phase and a forward propagation phase, according to an embodiment of the present invention. According to a Backward propagation phase, an embodiment of the present invention is directed to building a computation graph of what needs to be calculated and building mappings of how each calculation component is connected. In this phase, the flow is from right to left in the exemplary diagram of FIG. 3.

According to a Forward propagation phase, an embodiment of the present invention is directed to performing a path loop calculations. In this example, data is shuffled at each stage based on a mapping produced in the backward propagation phase. In this phase, the flow is from left to right in the exemplary diagram of FIG. 3.

Figure 4:
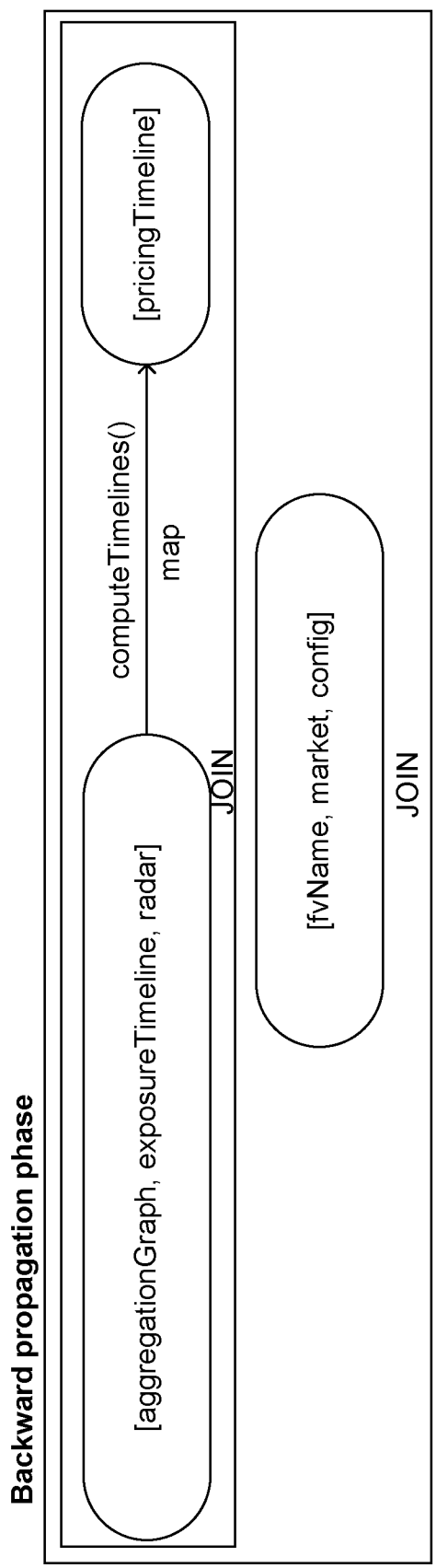
FIG. 4 is an exemplary diagram of a backward propagation phase, according to an embodiment of the present invention.

FIG. 4 is an exemplary diagram of a backward propagation phase, according to an embodiment of the present invention. FIG. 4 shows a joining of data sets to form inputs to simulate paths and calculate a profile of forward MtMs for each path. An embodiment of the present invention computes the time points for each trade for forward MtMs, taking into account information in an aggregation graph such as a cure period, in order to produce an exposure profile along the exposure timeline. This is joined with initial market data, name translators (which map names used in a radar (serialized description of a trade) to names used in the market) and configuration (which contains various calculation settings) to form the input for subsequent computations.

In the exemplary illustration, a radar provides a representation of a trade; aggregationGraph represents a description of counterparty in terms of netting, collateral etc. and trades; exposureTimeline represents a timeline for which exposure profile is required; pricingTimeline represents a timeline to price forward MtMs on; fvName represents a FV name translator (e.g., map of market names used by source systems to market names, etc.); market represents a current day's market; and computeTimelines( ) represents compute which dates each trade must be computed.

Figure 5:
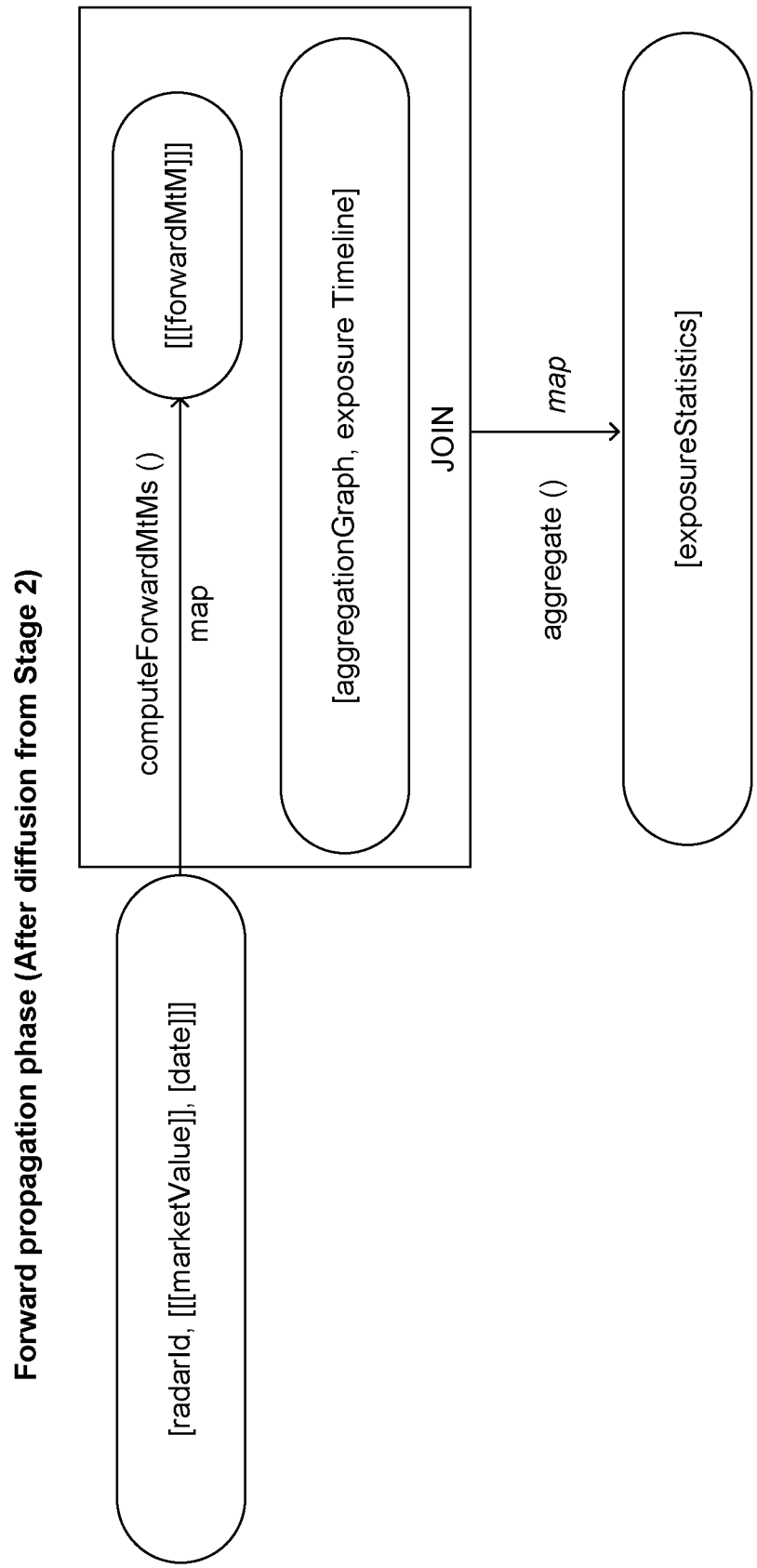
FIG. 5 is an exemplary diagram of a forward propagation phase, according to an embodiment of the present invention.

FIG. 5 is an exemplary diagram of a forward propagation phase, according to an embodiment of the present invention. After simulating market values for each path, an embodiment of the present invention may price trades to obtain the forward MtM cube (e.g., MtMs per date, trade and path, etc.). Using this and the aggregation graph, an embodiment of the present invention calculates an exposure profile for each path, which may be used to compute exposure statistics, for instance average exposure and CVA.

Figure 7:
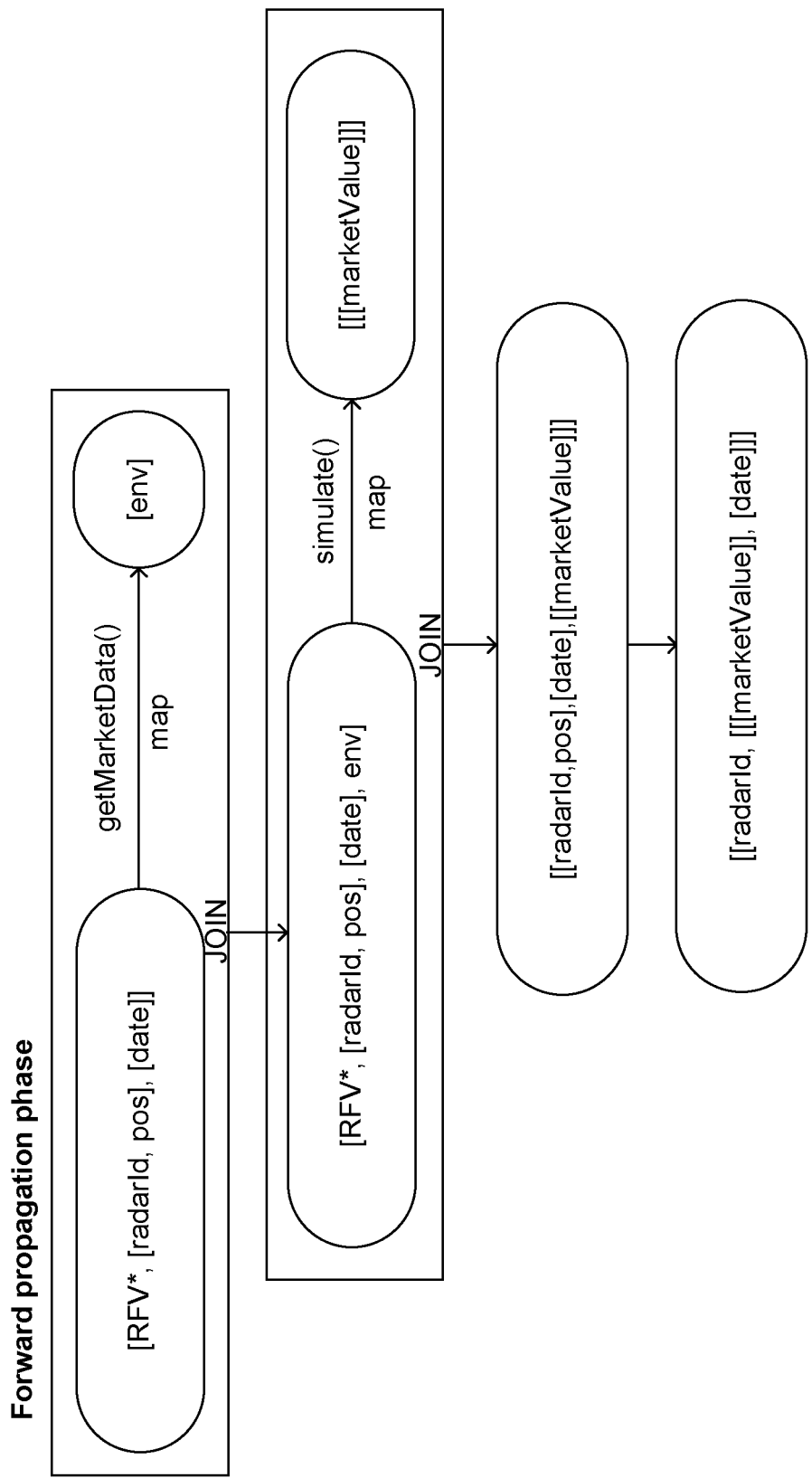
FIG. 7 is an exemplary diagram of a forward propagation phase, according to an embodiment of the present invention.

The exemplary forward propagation phase may be performed after a diffusion process illustrated in FIG. 7. In this exemplary illustration, an exposure Statistics represents a final requested set of results, e.g., CVA, FVA etc.; and aggregate( ) represents aggregate trades and paths.

Figure 6:
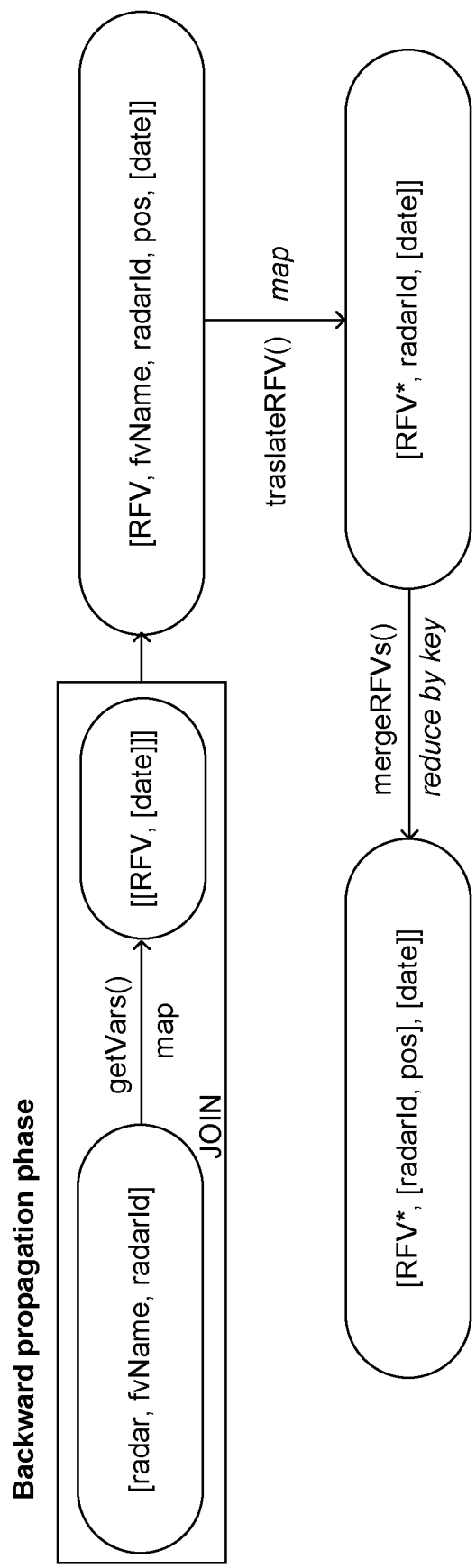
FIG. 6 is an exemplary diagram of a backward propagation phase, according to an embodiment of the present invention.

FIG. 6 is an exemplary diagram of a backward propagation phase, according to an embodiment of the present invention. FIG. 6 illustrates what market values need to be calculated to price each trade. RFV may represent a simulated market variable request, detailing an input a radar (e.g., a serialized description of a trade) needs to be simulated in order to compute a forward MtM. For example, RFV may be seen as simulated market value requests. In this example, RFVs are first translated to ensure equivalent requests from different radars, which potentially use different naming conventions (for different businesses), may be identical or similar. This may then be reduced into a unique set of RFVs, retaining which radar requires each RFV.

In this exemplary illustration, fvName represents FV name translator; RFV represents a fitting variable; RFV* represents a translated fitting variable; pos represents a position of RFV in output from getVars( ); getVars( ) returns RFVs and dates for a given radar; translateRFV( ) applies fvName to RFV; and mergeRFVs( ) merges dates and aggregates radarIds for all identical RFV*s.

FIG. 7 is an exemplary diagram of a forward propagation phase, according to an embodiment of the present invention. For each RFV, an embodiment of the present invention may create a set of simulated paths from the provided initial market data (env). An embodiment of the present invention may reorganise the data sets such that the required market values are in the correct order for each radar, this may potentially involve having many copies of the same simulated market values when multiple radars require the same quantity. An exemplary output of the simulation, market values, may be used as an input to FIG. 5, where forward MtMs are computed and then aggregated.

In this example, data may be shuffled to result in a set of marketValues for each radarIds in the order according to pos, a position of RFV. In this exemplary illustration, marketValue represents simulated value, one per RFV, per date, per path; getMarketData( ) represents get market data from data cache using RFV*; and simulate( ) represents simulate market value.

An embodiment of the present invention may be extended to other scenarios and applications. For example, the system may be extended to CVA sensitivities, as well as other value adjustment sensitivities. An embodiment of the present invention may perform a recomputation of the numbers with various different markets and other considerations. The system may consider a change in the market (e.g., if the market were to go up) and then determine what the CVA would be.

An embodiment of the present invention is directed to building a graph full of dependencies for an entire counterparty credit risk. This provides a real-time view of risk by updating the graph as changes are received. As those inputs change, the system may collectively update the results in an efficient manner by recalculating the calculations that actually need to be recalculated. Rather than a batch calculation, an embodiment of the present invention limits re-computing to a subset of calculations as changes are received.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

The invention claimed is:

1. A computer implemented system for optimizing evaluation of counterparty credit risk comprising:
a memory component; and
a calculation engine comprising a programmed computer processor, the calculation engine coupled to the memory component and further programmed to:
build a plurality of mappings of how each of a plurality of calculation components in counterparty credit risk calculation are connected together, wherein counterparty credit risk calculation comprises computing a profile of forward Mark to Market (MtM) price for each of a plurality of randomly selected trades associated with one or more counterparties;

generate, using the plurality of calculation components and the plurality of mappings, a computation graph for performing counterparty credit risk calculation in real time;

determine, using the plurality of mappings, a unique set of market variables required for computing a forward MtM price for each of the plurality of randomly selected trades, wherein each market variable in the unique set of market variables is associated with a calculation of a forward MtM price for one or more trades in the plurality of randomly selected trades;

generate a plurality of input values for calculating the forward MtM price profile for each of the plurality randomly selected trades, wherein the plurality of input values comprise a plurality of simulated market values, provided at each of a plurality of time points, for each market variable in the unique set, and wherein the plurality of time points are computed for each of the plurality of randomly selected trades based on respective counterparty information;

compute, using the computation graph, the forward MtM price profile for each of the plurality of trades, wherein the computation graph is dynamically updated in response to a change in one or more input values by only executing one or more calculation components associated with the one or more input values;

aggregate, using counterparty related information, one or more forward MtM price profiles corresponding to one or more trades associated with each of the one or more counterparties, to thereby generate a risk exposure profile for the one or more counterparties; and compute, using the risk exposure profiles provided by the computation graph, one or more risk exposure statistics corresponding to each of the one or more counterparties.

2. The system of claim 1, wherein the calculation engine applies a backward propagation phase.

3. The system of claim 2, wherein the calculation engine applies a forward propagation phase after the background propagation phase.

4. The system of claim 1, wherein a Mark to Market (MtM) price represents an accounting for a fair value of an asset or liability based on a current market price.

5. The system of claim 1, wherein the calculation engine is further programmed to reuse the forward MtM price in one or more workflows.

6. The system of claim 5, wherein the one or more workflows comprise one or more of what-if marginal pricing, credit value adjustment, and profit and loss.

7. The system of claim 1, wherein computing the profile of the forward MtM price for each of the plurality of randomly selected trades eliminates a step of bucketing trades and counterparties based on portfolio characteristics.

8. The system of claim 1, further comprising aggregating large counterparties as a whole to thereby eliminate a need for subnetting or breaking the counterparty into smaller units.

9. A computer-implemented method for optimizing real-time evaluation of counterparty credit risk, the method comprising:

grouping a plurality of randomly selected trades, wherein the plurality of randomly selected trades are associated with one or more counterparties;

building a plurality of mappings of how each of a plurality of calculation components in counterparty credit risk calculation are connected together, wherein counterparty credit risk calculation comprises computing a forward MtM price profile for each of the plurality of randomly selected trades;

generating, using the plurality of calculation components and the plurality of mappings, a computation graph for evaluating counterparty credit risk in real time;

determining, using the plurality of mappings, a unique set of market variables required for computing a forward MtM price for each of the plurality randomly selected trades, wherein each market variable in the unique set of market variables is associated with calculation of a forward MtM price for one or more trades in the plurality of randomly selected trades;

generating a plurality of input values for calculating the forward MtM price profile for each of the plurality randomly selected trades, wherein the plurality of input values comprise a plurality of simulated market values, provided at each of a plurality of time points, for each market variable in the unique set, and wherein the plurality of time points are computed, for each of the plurality of randomly selected trades, based on respective counterparty information;

computing, using the computation graph, a forward MtM price profile for each of the plurality of randomly selected trades, wherein the computation graph is dynamically updated in response to a change in one or more input values by only executing one or more calculation components affected by the change;

aggregating, using counterparty related information, one or more forward MtM price profiles corresponding to one or more trades associated with each of the one or more counterparties, to thereby generate a risk exposure profile for the one or more counterparties; and computing, using the risk exposure profiles provided by the computation graph, one or more risk exposure statistics corresponding to each of the one or more counterparties.

10. The computer-implemented method of claim 9, wherein an aggregation graph is used for aggregating, a profile of forward price for each of the one or more trades associated with each of the one or more counterparties.

11. The computer-implemented method of claim 10, wherein the aggregation graph comprises a description of the one or more counterparties in terms of cure period, netting, collateral and trades.

12. The computer-implemented method of claim 9, wherein the computation of the forward MtM price profile for each of the plurality of randomly selected trades further involves obtaining a forward MtM cube which represents an MtM price per date, trade and simulated market scenario.

13. The computer-implemented method of claim 9, wherein the one or more risk exposure statistics comprise average exposure and credit value adjustment.

14. The computer-implemented method of claim 9, wherein the unique set of market variables, retains information that associates each of the market variable included therein with one or more trades in the plurality of randomly selected trades.

15. The computer-implemented method of claim 9, further comprising organizing the plurality simulated market values for each market variable associated with each of the plurality of randomly selected trades, in accordance to a prescribed order for the corresponding trade.

16. The method of claim 15, wherein the prescribed order of the plurality of simulated market values, generated for each market variable, corresponds to a position of a fitting
variable representing the corresponding market variable.

\* \* \* \* \*